US012650078B2

(12) United States Patent
Desnoyer et al.

(10) Patent No.: US 12,650,078 B2
(45) Date of Patent: Jun. 9, 2026

(54) PROCESS FOR MANUFACTURING A GAS TURBINE ENGINE BLADE

(71) Applicants: SAFRAN AIRCRAFT ENGINES, Paris (FR); ALLIANCE, Saint-Vit (FR)

(72) Inventors: Victor Desnoyer, Moissy-Cramayel (FR); Mickaël Mabrut, Moissy-Cramayel (FR); Clément Gillot, Moissy-Cramayel (FR); Guillaume Paul Martin, Moissy-Cramayel (FR)

(73) Assignees: SAFRAN AIRCRAFT ENGINES, Paris (FR); ALLIANCE, Saint Vit (FR)

( * ) Notice: Subject to any disclaimer, the term of this patent is extended or adjusted under 35 U.S.C. 154(b) by 130 days.

(21) Appl. No.: 18/289,636

(22) PCT Filed: May 3, 2022

(86) PCT No.: PCT/FR2022/050856
§ 371 (c)(1),
(2) Date: Nov. 6, 2023

(87) PCT Pub. No.: WO2022/234229
PCT Pub. Date: Nov. 10, 2022

(65) Prior Publication Data

US 2024/0287905 A1 Aug. 29, 2024

(30) Foreign Application Priority Data

May 7, 2021 (FR) ...................................... 2104869

(51) Int. Cl.
*B22F 5/04* (2006.01)
*F01D 5/14* (2006.01)

(52) U.S. Cl.
CPC ................ *F01D 5/141* (2013.01); *B22F 5/04* (2013.01); *F05D 2220/323* (2013.01);
(Continued)

(58) Field of Classification Search
CPC ...... B22F 5/04; F01D 5/141; F05D 2220/323; F05D 2230/22; F05D 2230/40; F05D 2240/30
See application file for complete search history.

(56) References Cited

U.S. PATENT DOCUMENTS

| | | | | |
|---|---|---|---|---|
| 10,940,535 B2 * | 3/2021 | Barua | ...................... | B22F 10/00 |
| 2015/0037163 A1 * | 2/2015 | Ikegaya | ................ | F04D 29/324<br>416/223 R |

(Continued)

FOREIGN PATENT DOCUMENTS

| | | | | |
|---|---|---|---|---|
| FR | 2 944 721 A1 | 10/2010 | | |
| FR | 3 037 831 A1 | 12/2016 | | |
| WO | WO-2023175263 A1 * | 9/2023 | .............. | B23P 15/02 |

OTHER PUBLICATIONS

International Search report dated Aug. 22, 2022 in Appln No. PCT/FR2022/050856.

(Continued)

*Primary Examiner* — Sang K Kim
(74) *Attorney, Agent, or Firm* — Sughrue Mion, PLLC

(57) ABSTRACT

The invention relates to a process for manufacturing a turbomachine blade, wherein: —a part (4) is manufactured comprising a foot (4), a heel (6) and an air stream zone (10) extending between the foot and the heel, the air stream zone comprising at least one protuberance (20, 24, 26) projecting from a main face (12) of the zone, the manufacturing being performed by injecting a mixture comprising a binder and a powder, the powder comprising at least a metal or a ceramic: —debinding is performed on the part so as to eliminate a greater quantity of the binder from the part: —heat treatment is performed on the part; and—the or each protuberance is eliminated from the air stream zone.

18 Claims, 2 Drawing Sheets

(52) U.S. Cl.
CPC ...... *F05D 2230/22* (2013.01); *F05D 2230/40* (2013.01); *F05D 2240/30* (2013.01)

(56) References Cited

U.S. PATENT DOCUMENTS

| | | | |
|---|---|---|---|
| 2016/0363005 | A1 | 12/2016 | Heinrich |
| 2017/0067636 | A1 | 3/2017 | Lacy et al. |

OTHER PUBLICATIONS

French Search Report dated Nov. 18, 2021 in Application No. 2104869.

* cited by examiner

PROCESS FOR MANUFACTURING A GAS TURBINE ENGINE BLADE

CROSS REFERENCE TO RELATED APPLICATIONS

This application is a National Stage of International Application No. PCT/FR2022/050856 filed May 3, 2022, claiming priority based on French Patent Application No. 2104869 filed May 7, 2021, the contents of each of which being herein incorporated by reference in their entireties.

FIELD OF THE INVENTION

The invention relates to the manufacture of gas turbine engine blades.

STATE OF THE ART

The technology of metal powder injection (metal injection molding or MIM) to manufacture metal products is known. This technology makes it possible to meet high production rate needs while having good repeatability and good reproducibility.

It is an injection molding from a mixture of metal powder and polymer binder. This mixture forming an aggregate, called "feedstock", is extruded then cut into flakes or pellets to be used in an injection press.

After the injection, a part called "green" part held in place by the binder is obtained. This binder is then removed during the step called debinding step, which can be carried out in different ways (aqueously, thermally or chemically), which gives a part called "brown" part.

This part where nearly all of the binder has been removed is very fragile because it is composed of approximately 40% air, and is only bound by the remains of the binder. The brown part is finally sintered, step during which it is subjected to a temperature close to the melting point of the powder. This temperature allows the grains to weld together to create a solid.

After this step, a "gray" part is obtained, composed of the material of the powder only and having shrunk in relation to the volume of the molding due to the spaces left by the binder. Depending on the methods, parts with a density of 95% to 99.5% can be obtained for different applications. The part is then finished.

This technique makes it possible to create complex shapes with excellent surface finish and fine tolerances. More profitable for complex shapes, the metal powder injection molding allows the production of medium and large series of small parts for a large market. Being part of the family of replication techniques, it is very efficient in raw materials (for the powder part). It does not create waste and oil is not used.

However, the shrinkage of the part mentioned above makes it difficult to apply this technique for the manufacture of gas turbine engine blades. Indeed, a removal of up to 15% of a dimension of the blade is observed. However, it is important to accurately control the dimensions of this type of part. In addition, the thermal variations to which the blade is subjected during the manufacture can cause deformations or cracks. This is all the more sensitive as the blades are generally asymmetrical and have thicknesses in certain locations which are up to 3.5 times greater than the thickness in another location of the blade.

One aim of the invention is therefore to make the manufacture of the gas turbine engine blades easy and more reliable, in particular by injection of metal powder.

DISCLOSURE OF THE INVENTION

For this purpose, a method for manufacturing a gas turbine engine blade is provided according to the invention, in which:

- a part comprising a base, a root and an air stream area extending between the base and the root is manufactured,
- the air stream area comprising at least one protuberance protruding from a main face of the area,
- the manufacture taking place by injection of a mixture comprising a binder and a powder, the powder comprising at least one metal or ceramic;
- a debinding of the part is carried out so as to eliminate a greater part of the binder from the part;
- a heat treatment of the part is carried out; and
- the or each protuberance of the air stream area is eliminated.

As will be seen below, depending on their configuration, the protuberance(s) can have different functions, namely serving as a support for the part during manufacture and/or as a stiffener. Thus, they make it possible to avoid the appearance of deformation phenomena such as sagging, torsion, bending and buckling and of mechanical stresses related to the manufacturing process. The invention thus allows the manufacture of elongated parts of complex geometry, in particular asymmetrical parts, and makes it possible to control the dimensions of the part, while making possible a material removal comprised between 10 and 27% during manufacture. The invention allows high-rate production. It reduces material losses during manufacture. The entire manufacture can be done with an optimized budget.

In one mode of implementation, during manufacture, in particular during the heat treatment step, the part is in contact with a support via the protuberance (s).

The protuberances therefore serve here as support integrated into the part in order to prevent its deformation, in particular its sagging, during manufacture. This may for example be the sintering step during the implementation of the metal powder injection technique.

In one mode of implementation, the protuberance or at least one of the protuberances is a rib.

These ribs then form stiffeners that limit the deformations of the part during the temperature variations it experiences.

The method according to the invention may further have at least one of the following characteristics:

- the or one of the ribs forms a closed loop;
- the or one of the ribs has a circular, oval or elliptical shape;
- the ribs are at least two in number and comprise at least two transverse ribs each extending from a first longitudinal edge of the air stream area to a second longitudinal edge of the air stream area;
- at least one of the transverse ribs is curved;
- the transverse ribs are spaced from each other by a distance comprised between 5 and 25 mm;
- the ribs are at least two in number and comprise at least two radial ribs each located in the alignment of the same midpoint of the air stream area;
- at least one of the radial ribs extends up to the base or to the root.
- at least one of the radial ribs extends up to a longitudinal edge of the air stream area;

at least one of the transverse ribs intercepts at least one of the radial ribs;

the protuberance(s) form(s) an arrangement having a plane of symmetry or a center of symmetry;

the protuberance(s) has/have a thickness comprised between 1 and 8 mm;

the protuberance(s) has/have an area of connection with the main face having a radius comprised between 0.2 and 2 mm; and the part is manufactured in a titanium and aluminum alloy.

It can be provided that the protuberance(s) has/have an edge opposite to the main face, the edge extending in a plane or the edges of the protuberances extending in the same plane.

This/these edge(s) thus serve(s) as a support face for the part during manufacture.

A gas turbine engine blade, in particular an aircraft turbine engine, is also provided according to the invention, the blade comprising a base, a root and an air stream area extending between the base and the root, the blade resulting from the implementation of a method according to the invention.

Such a blade may have, on a macroscopic level, a shape and dimensions identical to those of a blade manufactured through a method of the prior art. However, it differs in its microscopic structure. Thus, it has a grain size on average larger than that of the blade obtained by a method of the prior art and it offers better resistance to creep.

A gas turbine engine comprising at least one blade according to the invention is moreover provided according to the invention.

There is also provided according to the invention a part comprising:

a gas turbine engine blade, the blade comprising a base, a root and an air stream area extending between the base and the root, and at least one protuberance protruding from a main face of the air stream area.

This part constitutes the intermediate product obtained during the implementation of the first step of the method of the invention, before the elimination of the rib(s).

DESCRIPTION OF THE FIGURES

One embodiment of the invention will now be presented by way of non-limiting example in support of the drawings in which.

One mode of implementation of the manufacturing method according to the invention will be presented for the production of a gas turbine engine blade.

In a first step, an intermediate part 4 comprising a blade is manufactured. This part is illustrated in its principle in FIG. 1 and in detail in FIGS. 2 to 4.

The part and the blade thus comprise a base 6, a root 8 and a vane or air stream area 10 extending between the base and the root.

Figure 1:
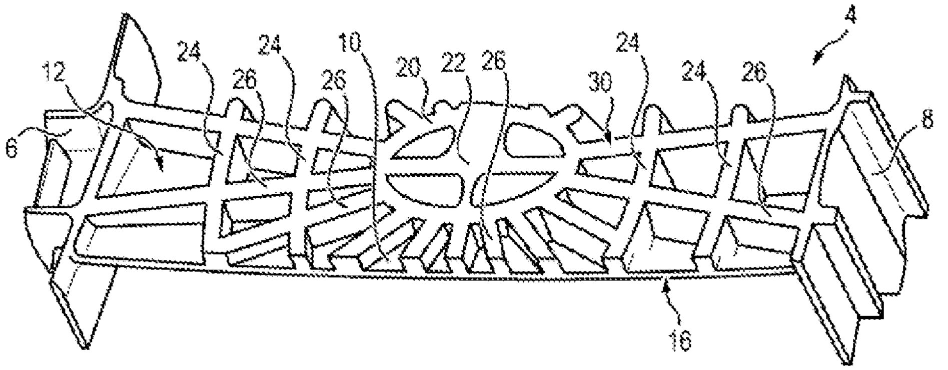
FIG. 1 is a perspective view of the main shape of an intermediate part obtained in one mode of implementation of the method of the invention.
Figure 2:
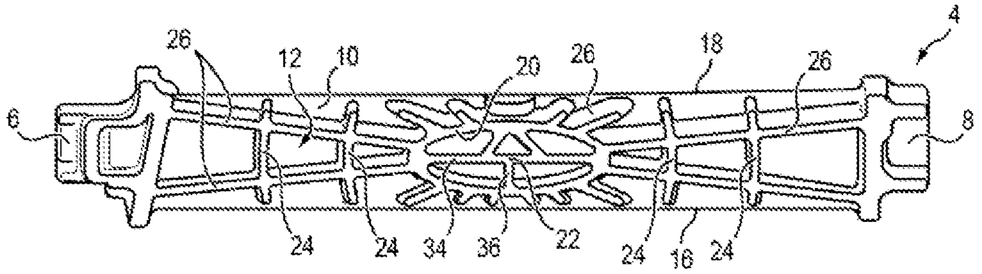
FIG. 2 is a view showing such an intermediate part on the intrados side.
Figure 3:
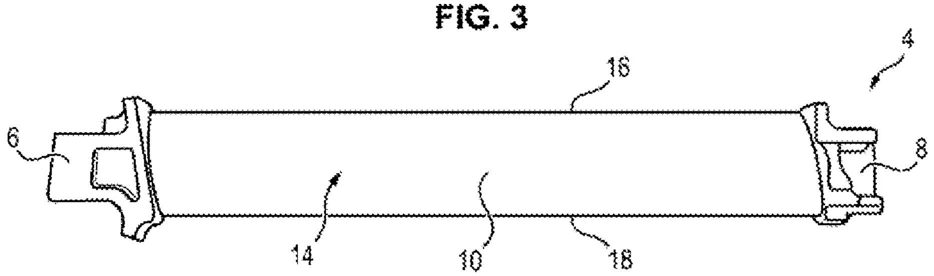
FIGS. 3 and 4 are views of the same part on the extrados side.
Figure 4:
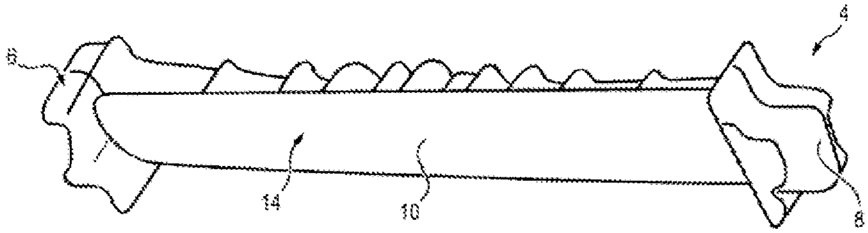

The air stream area 10 has two main faces, namely an intrados face 12 visible in FIGS. 1 and 2 and an extrados face 14, visible in FIGS. 3 and 4. The two faces are delimited by a leading edge 16 and a trailing edge 18 forming the two longitudinal edges of the blade. Each main face 12, 14 extends from the base to the root.

The air stream area 10 comprises protuberances, here forming ribs, protruding from the intrados face 12, as illustrated in FIGS. 1 and 2.

One 20 of the ribs forms a closed central loop and in this case has an elliptical shape. The major axis of the ellipse is globally parallel to the edges 16 and 18. The rib has a center of symmetry located in line with a barycenter 22 of the part and/or of the blade and coincides therewith in the figures. This barycenter 22 forms a midpoint and central point of the blade.

The air stream area 10 also comprises in this case transverse ribs 24 each extending from the leading edge 16 to the trailing edge 18. The transverse ribs 24 are curved, which further reduces the risk that harmful phenomena such as cracks appear. Each transverse rib 24 has a center of curvature located on the same side of the rib as the center of the ellipse 22. The transverse ribs 24 are here four in number, namely two between the elliptical rib 20 and the base 6 and two others between the elliptical rib 20 and the root 8. The adjacent transverse ribs 24 are spaced from each other by a distance comprised between 5 and 25 mm.

The air stream area 10 also comprises in this case rectilinear radial ribs 26 each located in the alignment of the center 22 of the air stream area. In other words, although each radial rib 26 is interrupted before reaching this midpoint and therefore does not reach it, this point 22 would be on the rib if it were extended in a rectilinear manner.

All the radial ribs 26 here have a first end located on the elliptical rib 20 from which the radial ribs radiate.

Two of the radial ribs 26 extend up to the base 6. Two others extend up to the root 8. These ribs can be described as longitudinal because they extend over a large part of the length (more than a third) of the air stream area 10 and in a direction slightly inclined relative to the longitudinal direction. In this case, they each intercept two of the transverse ribs 24, which amounts to saying that they are intercepted by them.

Several other radial ribs 26, in this case four, extend up to the trailing edge 18. Furthermore, several other radial ribs 26, in this case six, extend up to the leading edge 16.

There is therefore in the present example a total of 14 radial ribs 26, this number being in no way limiting.

All the ribs 20, 24 and 26 form in this example an arrangement globally having a plane of symmetry. It even has two planes of symmetry perpendicular to each other and corresponding to the axes of the ellipse, so that the arrangement presents a center of symmetry coincident with the center 22. The arrangement of the ribs here resembles that of a spider web.

These symmetries concern the general arrangement of the ribs, each rib thus having a rib which occupies a position symmetrical to its own. But they do not relate to the precise dimensions of the ribs, as can be seen in particular in FIG. 1 where the ribs located to the right have a height, measured in a direction locally perpendicular to the intrados face, greater than those located to the left. This results from the fact that the ribs protrude from the intrados face which has a left shape and does not present any of these symmetries in its dimensions. However, the free edge 30 of each rib opposite to the intrados face extends in a plane common to the edges 30 of all the ribs. The edges 30 of the ribs, in this plane, form an arrangement which has an overall central symmetry closer to an exact central symmetry.

Ribs are also present inside the looped rib 20. These include a rectilinear rib 34 occupying the entire major axis of the ellipse and a rib 36 occupying half of the minor axis, as illustrated in FIG. 2.

The ribs extend only on the intrados face 12, the extrados face 14 remaining completely free of ribs.

In this case, the manufacture implements an injection of metal powder. The manufacture takes place by means of injection molding from a mixture of metal powder and polymer binder. The metal powder is here an alloy of titanium and aluminum such as Ti-48Al-2Cr-2Nb (in atomic %) commonly referred to as TiAl 48-2-2).

Once the part has been injected, a part held in place by the binder is obtained. This binder is then removed during the debinding operation, which gives the "brown" part. In this part, almost all of the binder has been removed and it is composed of about 40% air, and is bound only by the remains of the binder. It must then be sintered, a step during which it is subjected to a temperature close to the melting point of the powder, for example above 1,200° C.

After this operation, a "gray" part is obtained, composed of the powder material only and having shrunk in relation to the volume of the molding due to the spaces left by the binder.

This part 4 is made in one block. During the debinding and sintering operations, the part rests on a planar support, the ribs 20, 24, 26 being located in the lower part and the extrados face 14 facing upwards. The edge 30 of the ribs is therefore bearing on the planar support and in contact therewith. It provides local support to the air stream area. The part also rests on the manufacturing support by the base 6 and the root 8.

The ribs 20, 24, 26 not only form support but also stiffeners which make it possible to preserve the shape of the part and its integrity during these operations, particularly during sintering and then cooling.

At the end of this first manufacturing step, a part forming an intermediate product and consisting of the blade and of the ribs as illustrated in FIGS. 2 to 4 are therefore obtained.

Then, the ribs 20, 24, 26 are eliminated from the air stream area, for example by machining.

Figure 5:
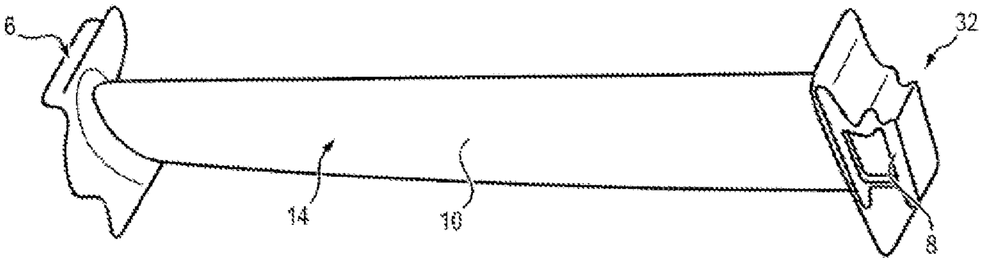
FIG. 5 is a view similar to FIG. 4 showing the blade obtained from this intermediate part.

A part consisting of the single blade 32 illustrated in FIG. 5 is then obtained. The blade comprises the base 6, the root 8 and the air stream area 10. The two intrados 12 and extrados 14 faces are smooth and free of any protuberance.

On the blade 32, the air stream area 10 has a thickness which is approximately 3.5 times smaller than that of the base 6 and the root 8. This difference can have a significant impact during the cooling and shrinkage of the part in the absence of protuberances. The ribs are precisely disposed and dimensioned as explained above in order to increase this ratio from 3.5 to approximately 2 in this case. In particular, the central portion of the air stream area is made more massive with the protuberances. Globally, taking into account the location of the massiveness areas of the part 4 makes it possible to distribute the material during the design in order to avoid excessive differences in thickness over the entire part.

In addition, in the absence of support from the ribs, the air stream area 10 would sag during manufacture. This is why the ribs are disposed on the air stream area, in order to support it. The ribs which extend in different directions and at different locations in the part help to avoid different types of deformation to which the blade would otherwise be exposed during manufacture.

As can be seen, the ribs are uniformly distributed, in particular so that the bearing points of the part on the manufacturing support are also uniformly distributed. The arrangement of the ribs takes into account a reference point which remains fixed throughout the manufacture of the part which is the barycenter 22 thereof. The ribs are disposed according to this point, or even from it. Indeed, taking into account the position of the center of gravity 22 of the assembly makes it possible to better control the removal inherent to the method.

Each rib here has a thickness comprised between 1 and 8 mm. It is indeed preferable to give a significant width to the stiffeners. If they are too thin, they are difficult to inject and deform during the removal of the part. In our case, the choice of range is related to the minimum thicknesses of the part.

In addition, each rib in this case has an area of connection with the intrados face 12 having a radius comprised between 0.2 and 2 mm, which makes it possible to promote the injection and eliminate internal stress concentrations. This condition on the dimension of the radii makes it possible to limit cracking phenomena, to make the injection more favorable and to avoid tearing during the injection of the part out of the mold.

Furthermore, it will be preferably made sure to take into account in the design of the part to be manufactured and forming the blade-ribs assembly, the injection constraints and the phenomena of segregation, core porosity and internal stress which are generated and detected during sintering.

Figure 6:
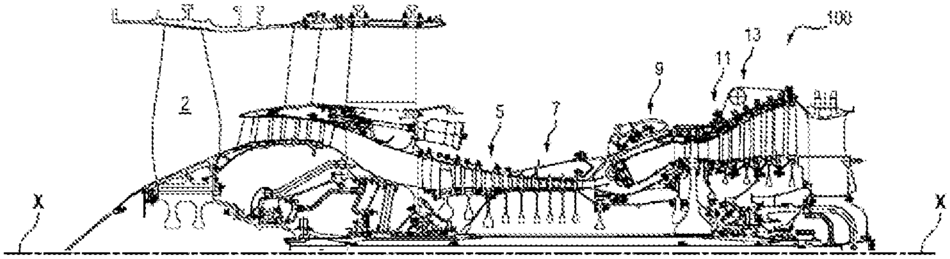
FIG. 6 is a sectional view of an aircraft turbojet engine incorporating such a blade.

In the present example, the blade 32 is intended to form part of an aircraft turbojet engine 100 forming here a twin spool and airflow gas turbine engine like the one illustrated in FIG. 6. The gas turbine engine has a main axis X-X which serves as axis of rotation of the rotor relative to the stator.

It comprises from upstream to downstream, therefore from left to right in FIG. 6, a fan 2, a low-pressure compressor 5, an intermediate pressure compressor, a high-pressure compressor 7, a combustion chamber 9, a high-pressure turbine 11 and a low-pressure turbine 13. These elements, with the exception of the fan, form a central part of the turbojet engine. Their parts movable in rotation about the axis X-X form the rotor.

The high-pressure compressor 7, the combustion chamber 9 and the high-pressure turbine 11 form a high-pressure body, which together with the low-pressure compressor 5 and the low-pressure turbine 13 define a main air stream. A nacelle surrounds the fan 2 and the central part so as to form a fan compartment and to define a secondary air stream.

The turbines 11, 13 comprise blades 32 manufactured through the invention.

The invention is applicable to other manufacturing technologies, for example feedstock printing and feedstock compaction.

The manufacture could also take place using the binder jetting printing technique. The latter is an additive manufacturing method which works by binder jetting onto a powder. An automated roller distributes a thin layer of powder onto a build tray. A print head applies a liquid binder to the powder, creating a layer of the object. Then, the printing platform carrying the tray slightly goes down to allow the addition of a new layer of powder. The method is thus repeated until creation of the object. The excess powder is thus sucked up and the object is dusted using compressed air. Then the printed part is placed in an oven for baking or sintered. Finally, a finish treatment can improve the condition of the printed part. As before, the ribs are then removed from the intermediate product thus produced to obtain the blade itself.

As the invention relates to the manufacture of metal parts, in particular by the metal powder injection method, it can be used in all technical fields.

Numerous modifications can be made to the invention without departing from its scope.

The protuberances may be other than ribs and have shapes other than those presented above and be round, square, star-shaped, stud-shaped, half-ball shaped, etc. They can provide a stiffening function without providing a support function and vice versa.

The invention claimed is:

1. A method for manufacturing a blade of a gas turbine engine, the method comprising:
- manufacturing a part comprising a base, a root and an air stream area extending between the base and the root,
- the air stream area comprising at least one protuberance protruding from a main face of the air stream area,
- wherein the manufacturing comprises:
- injecting a mixture comprising a binder and a powder, the powder comprising at least one metal or at least one ceramic;
- debinding the part to eliminate a major part of the binder from the part;
- heat treating the part; and
- eliminating the at least one protuberance of the air stream area,
- wherein the at least one protuberance further comprises a plurality of protuberances, the plurality of protuberances comprising at least two transverse ribs, each transverse rib of the at least two transverse ribs extending from a first longitudinal edge of the air stream area to a second longitudinal edge of the air stream area, and
- wherein at least one transverse rib of the at least two transverse ribs is curved.

2. The method according to claim 1, wherein, during manufacture, the part is in contact with a support via the at least one protuberance.

3. The method of claim 2, wherein the part is in contact with the support via the at least one protuberance during the heat treating.

4. The method according to claim 1, wherein the at least one protuberance comprising at least one rib, and wherein a rib of the at least one rib forms a closed loop.

5. The method according to claim 1, wherein the at least one protuberance comprising at least one rib, and wherein a rib of the at least one rib forms a circular, oval or elliptical shape.

6. The method according to claim 1, wherein each transverse rib of the at least two transverse ribs is spaced from another transverse rib of the at least two transverse ribs by a distance between 5 and 25 mm.

7. The method according to claim 1, wherein the at least one protuberance forms an arrangement having a plane of symmetry.

8. The method according to claim 1, wherein the at least one protuberance forms an arrangement having a center of symmetry.

9. The method according to claim 1, wherein a thickness of the at least one protuberance is between 1 mm and 8 mm.

10. The method according to claim 1, wherein the at least one protuberance comprises an area of connection with the main face a radius of the area of connection with the main face being between 0.2 mm and 2 mm.

11. The method according to claim 1, wherein the part comprises an alloy of aluminum and titanium.

12. The method according to claim 1, wherein the at least one protuberance comprises at least one edge opposite to the main face, the at least one edge extending in a same plane.

13. The method according to claim 1, wherein the plurality of protuberances further comprises at least two radial ribs, each radial rib of the at least two radial ribs being located in an alignment of a same midpoint of the air stream area, and
- at least one of the transverse ribs intercepts at least one of the radial ribs.

14. A part comprising:
- a gas turbine engine blade comprising a base, a root and an air stream area extending between the base and the root, and
- at least one protuberance protruding from a main face of the air stream area,
- wherein the at least one protuberance further comprises a plurality of protuberances, and wherein:
  - the plurality of protuberances comprises at least two transverse ribs, each transverse rib of the at least two transverse ribs extending from a first longitudinal edge of the air stream area to a second longitudinal edge of the air stream area, at least one transverse rib of the at least two transverse ribs being curved, or
  - the plurality of protuberances comprising at least two radial ribs, each radial rib of the at least two radial ribs being located in an alignment of a same midpoint of the air stream area.

15. A method for manufacturing a blade of a gas turbine engine, the method comprising:
- manufacturing a part, the part comprising a base, a root and an air stream area extending between the base and the root, the air stream area comprising at least one protuberance protruding from a main face of the air stream area, the manufacturing being carried out by injecting a mixture, the mixture comprising a binder and a powder, and the powder comprising at least one metal or at least one ceramic;
- debinding the part so as to eliminate a major part of the binder from the part;
- heat treating the part; and
- eliminating the at least one protuberance of the air stream area,
- wherein the at least one protuberance further comprises a plurality of protuberances, the plurality of protuberances comprising at least two radial ribs, each radial rib of the at least two radial ribs being located in an alignment of a same midpoint of the air stream area.

16. The method according to claim 15, wherein at least one radial rib of the at least two radial ribs extends up to the base or to the root.

17. The method according to claim 16, wherein the plurality of protuberances further comprises at least two transverse ribs, each transverse rib of the at least two transverse ribs extending from a first longitudinal edge of the air stream area to a second longitudinal edge of the air stream area, at least one transverse rib of the at least two transverse ribs intercepts at least one radial rib of the at least two radial ribs.

18. The method according to claim 15, wherein at least one radial rib of the at least two radial ribs extends up to a longitudinal edge of the air stream area.

* * * * *